United States Patent [19]

Kadle

[11] Patent Number: 5,219,023
[45] Date of Patent: Jun. 15, 1993

[54] THREE ROW CONDENSER WITH HIGH EFFICIENCY FLOW PATH

[75] Inventor: Prasad S. Kadle, Getzville, N.Y.

[73] Assignee: General Motors Corporation, Detroit, Mich.

[21] Appl. No.: 848,581

[22] Filed: Mar. 9, 1992

[51] Int. Cl.[5] ............... F28B 1/00; F28D 1/053
[52] U.S. Cl. ......................... 165/110; 165/150
[58] Field of Search ............ 165/110, 150, 903; 62/507

[56] References Cited

U.S. PATENT DOCUMENTS

| | | | |
|---|---|---|---|
| 2,669,099 | 2/1954 | Malkoff | 165/150 |
| 4,053,014 | 10/1977 | Neff et al. | 165/150 |
| 4,089,368 | 5/1978 | Bell, Jr. et al. | 165/150 |
| 4,344,482 | 8/1982 | Dietzsch | 165/172 |
| 4,502,532 | 3/1985 | Tomozaki et al. | 165/150 |
| 4,520,867 | 6/1985 | Salla et al. | 165/150 |
| 4,690,209 | 9/1987 | Martin | 165/150 |
| 4,831,844 | 5/1989 | Kadle | 62/507 |
| 4,945,983 | 8/1990 | Dalo | 165/173 |
| 4,995,453 | 2/1991 | Barlett | 165/150 |
| 5,076,353 | 12/1991 | Haussmann | 165/150 |

Primary Examiner—Martin P. Schwadron
Assistant Examiner—L. R. Leo
Attorney, Agent, or Firm—Ronald L. Phillips

[57] ABSTRACT

A three row condenser for cooling alternative refrigerants for use in automotive air conditioning systems has a continuously formed U-bend tube forming the air inlet to the condenser at a point upstream of second and third rows of like tubes each interconnected by parallel heat conducting cooling fins; the high pressure vapor inlet flow to the condenser is substantially equally distributed into the first, second and third rows and refrigerant flow in the first and second rows of tubes is combined upstream of the outlet of the condenser to provide a series connected tube pattern for increasing the flow velocity through outlet portions of the first and second rows of tubes so as to improve the efficiency of energy transfer between the refrigerant flow through the condenser and the air flow across the air fins therein.

4 Claims, 3 Drawing Sheets

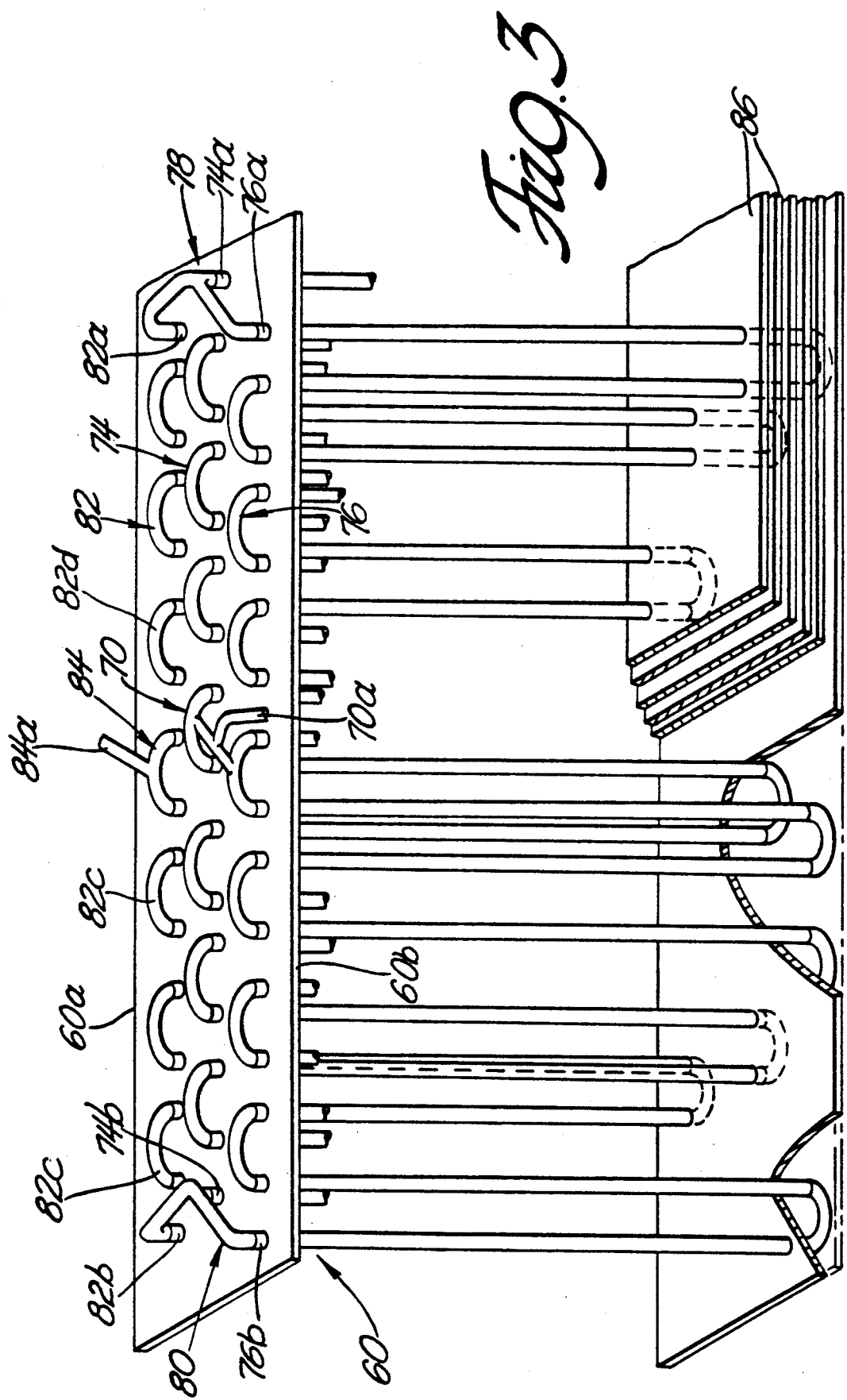

THREE ROW CONDENSER WITH HIGH EFFICIENCY FLOW PATH

FIELD OF THE INVENTION

This invention relates to heat exchangers and, more particularly, to condensers for use in the refrigerant circuit of an air conditioning system for motor vehicles and, more particularly, to such condensers having a plurality of rows of continuously bent tubes interconnected by a plurality of parallel air cooling fins having improved heat exchange efficiency.

BACKGROUND OF THE INVENTION

Present day motor vehicle air conditioning systems include an engine driven turbocompressor which compresses chlorofluorocarbon refrigerants an example of which is dichlorodifluoromethane designated CFC-12 manufactured by duPont Corporation. Such refrigerant, once compressed, is condensed in a condenser to high pressure liquid and thereafter expanded by means of an expansion device such as an orifice tube or a thermostatic expansion valve to produce evaporative cooling within an evaporator. The evaporative cooling effect is used to cool air flow across the evaporator for cooling air flow to a passenger compartment of a vehicle.

While suitable for their intended purpose, the refrigerant used in such systems has been identified as a source of ozone depletion.

One alternative refrigerant, 1,1,1,2-tetrafluoroethane designated HFC-134a, proposed to be manufactured on a commercial scale by companies like duPont, Allied Signal, and ICI, has been identified that has the potential for zero ozone depletion.

Condensers used in the refrigeration circuit of an automobile air conditioning system have a double flow construction. In such construction, two separate, continuously bent tube systems are provided in parallel relationship and are traversed by vehicle air flow thereacross for removing heat from parallel flows of refrigerant through the heat exchanger. Such arrangements enable the refrigerant flow through the condenser to experience a lower pressure drop and a lower flow velocity.

U.S. Pat. No. 4,344,482 provides a two row pattern of tubes which has less tube depth than a tube arrangement having two separate flow patterns while retaining the heat advantage of low pressure drop through the refrigerant circuits.

U.S. Pat. No. 4,831,844 issued May 23, 1989 and commonly assigned to the assignee of this application, provides a condenser configuration in which tubing is arranged to increase refrigerant liquid velocity and to increase the tube volume for condensation.

While such tube systems are presently satisfactory for use in automotive air conditioning systems using Freon type refrigerants, they will not provide a sufficient cooling efficiency when used in association with refrigerant circuits having alternative refrigerants.

SUMMARY OF THE INVENTION

Accordingly, an object of the present invention is to provide a three row condenser having a tube pattern that retains a substantial tube volume for the condensation process and wherein three rows of tube bends are arranged so that the tube portions cooled by the inlet air flow through the condenser are, in part, arranged in series flow relationship to improve the cooling efficiency of the heat exchanger.

An object of the present invention is to provide a high efficiency three tube row condenser for an automotive air conditioning system having first, second and third rows of continuously bent tubes connected to cooling fins; and wherein each of the first, second and third rows of continuously bent tubes has an inlet tube and an outlet tube; a three pronged inlet fitting is adapted to connect the high pressure vapor side of a refrigerant system in an automobile air conditioning system to the inlet tubes and three pronged fitting connected to the outlet tubes of the first, second and third rows of continuously bent tubes and wherein a cross over tube connects the first row of continuously bent tubes to the second row of continuously bent tubes between the inlet and outlet tubes thereof for causing the refrigerant flow through the first and second rows to be combined in series flow relationship with each other and in parallel flow relationship to flow through the third row from the condenser.

A further object is to provide improved high efficiency flow in the condenser assembly of the preceding object by providing the second row of continuously bent tubes as a plurality of bent tubes directing the combined refrigerant flow from the first and second rows of continuously bent tubes to a condenser outlet and the second three prong fitting combining flow through all the rows upstream of the condenser outlet and wherein part of the continuously bent tubes of the first row directs the combined flow from all three rows to the high pressure liquid side of a refrigerant circuit in an automotive air conditioning system.

A still further object of the present invention is to provide the condenser of the first object with first and second rows of continuously bent tubes including a plurality of U-bends located in a zig-zag pattern between parallel tube segments of continuously bent tubes for receiving the combined refrigerant flow from the first and second rows of continuously bent tubes for flow therefrom through to the condenser outlet and wherein the condenser outlet combines the refrigerant flow through the third row of continuously bent tubes and the combined flow through said zig-zag pattern of U-bends to direct refrigerant from the condenser to the high pressure liquid side of a refrigerant circuit in an automotive air conditioning system.

These and other objects, features and advantages of the present invention will become more apparent from the following description, when taken in connection with the accompanying drawings which show, for the purposes of illustration only, two embodiments in accordance with the present invention wherein:

DESCRIPTION OF THE DRAWINGS

FIGS. 2 and 3 are schematic perspective views, partially broken away, of a second and third embodiment of a condenser arrangement for an air conditioning unit of a motor vehicle in accordance with the present invention.

DESCRIPTION OF PREFERRED EMBODIMENTS OF THE INVENTION

Figure 1:
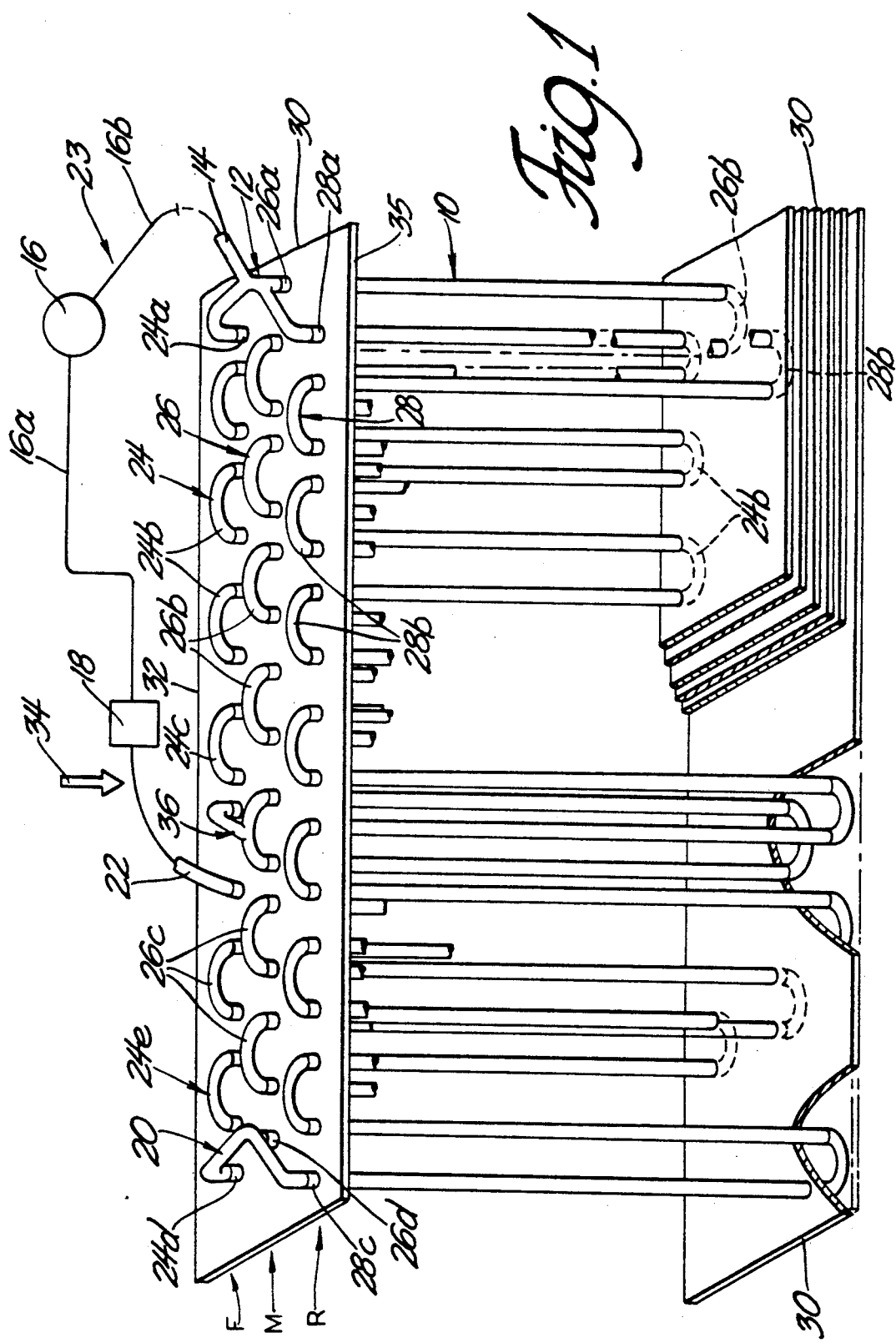
FIG. 1 is a schematic perspective view, partially broken away, of a condenser arrangement for an air conditioning unit of a motor vehicle.

FIG. 1 illustrates a condenser 10 having a three pronged inlet fitting 12 with an inlet 14 adapted to be connected to the outlet of a compressor 16 that draws refrigerant through a suction line 16a from an evaporator 18 for discharge through a high pressure vapor conduit 16b into the inlet fitting 12. The condenser 10 further includes a three pronged outlet fitting 20 that is connected to a condenser outlet 22 for discharging high pressure liquid from the condenser 10 to the evaporator 18 to complete a refrigeration circuit 23 of the type found in automotive air conditioning systems.

Figure 2:
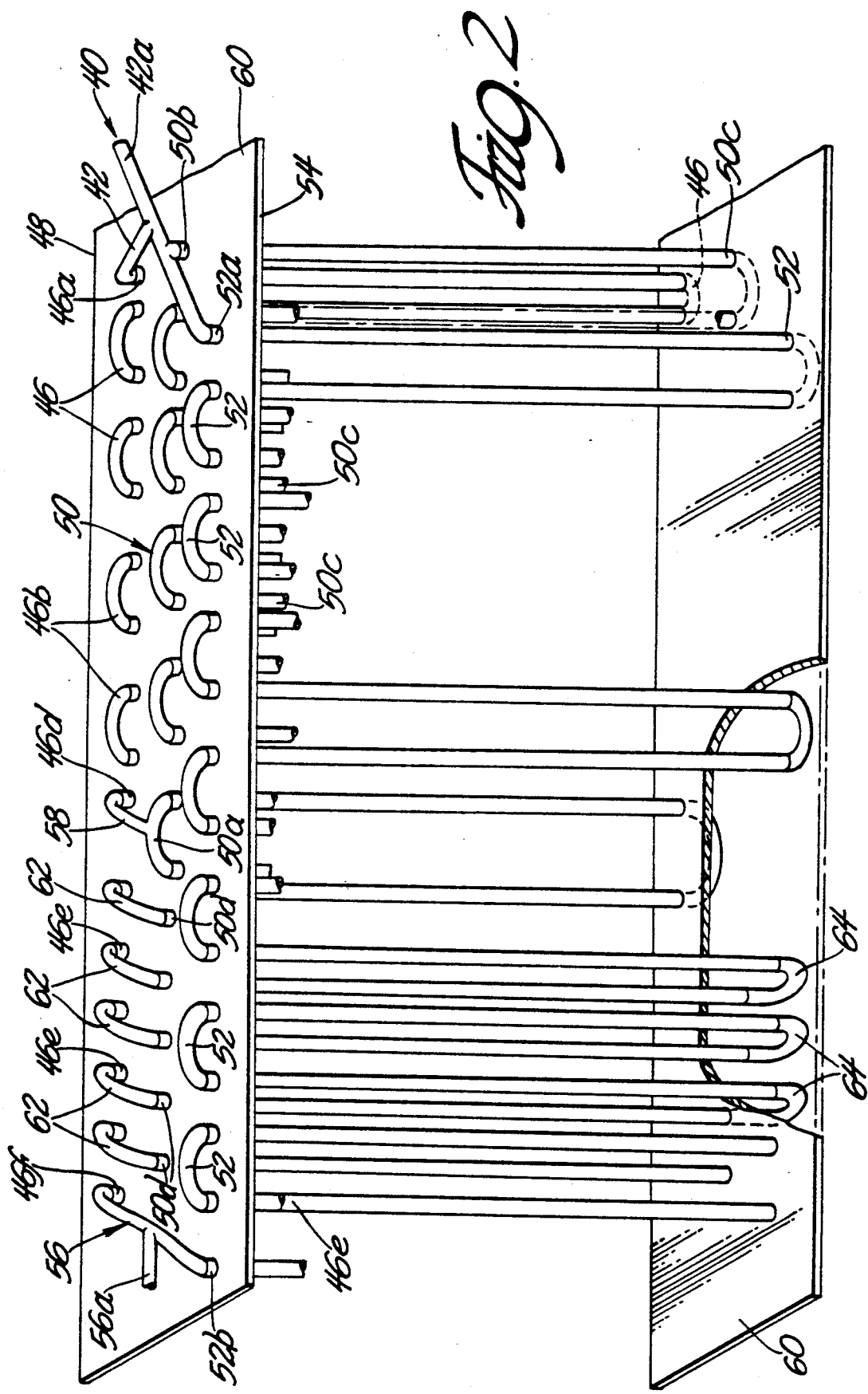

In the illustrated arrangement, the condenser 10 includes three spaced continuously bent tube rows 24, 26, 28 each of which are joined by a plurality of parallel air cooling fins 30 for forming an air inlet side 32 of the condenser 10 through which vehicle air flow is directed as shown by the arrow 34. The vehicle air flow is discharged from the condenser through an air outlet side 35 thereof, as best seen in FIG. 2. The tube row 24 is a front row (marked F) which is facing the incoming air flow shown by arrow 34. The tube row 26 is a middle row (marked M) and the tube row 28 is a rear row (marked R) facing in the opposite direction.

In common practice, the material for all these parts is aluminum or sometimes copper and the tubes are all interconnected by brazing or soldering to assure pressure tight tube connections. The fins are brazed or mechanically joined to the tubes to provide excellent thermal conductivity from the tubes to the fins. As thus far described in this paragraph, the condenser structure is well known and the method of manufacture of such devices is also known. Indeed, the straight tube array and header plate assembly are unchanged in the improved condenser, the routing changes being accomplished by the tube interconnecting bends.

In accordance with certain principles of the present invention, the first row 24 of continuously bent tubes has an inlet tube 24a thereof that communicates with a first set of parallel tubes and U-bends 24b of the first row 24 that in turn are connected to an outlet tube 24c that is connected at the top thereof through a cross over tube 36 to the second row of continuously bent tubes 26 downstream of a first set 26b of bent tubes in the row of tubes 26 that is connected to the inlet fitting 12 by an inlet tube 26a. The second row of tubes 26 includes a second set of parallel tubes and U-bends 26c that connect to an outlet tube 26d to the outlet fitting 20. The outlet fitting 20 connects to an outlet tube 24d of the tube row 24 which is in turn connected to a second set of parallel tubes and return bends 24e in the first row of tubes 24 that serves to direct a combined flow of fluid from all of the tube rows 24, 26, and 28 to the condenser outlet 22.

The third row of tubes 28 (rear row R) is connected by an inlet tube 28a to the inlet fitting 12 and directs high pressure refrigerant vapor through a series connected plurality of parallel tubes and U-bends 28b to an outlet tube 28c that connects to the outlet fitting 20 where the flow through the third row 28 is combined in the outlet fitting 20 with flow through from the tube section 24b and tube row 26. All of the combined flow (now high pressure liquid) is directed through a minimum volume tube section represented by tube and return bends 24e.

By virtue of the aforesaid arrangement, an alternative refrigerant such as discussed above can be charged in the refrigerant circuit 23 for efficient cooling within the three rows of tubes 24, 26, 28. The efficient cooling is in part due to the fact that the refrigerant flow through the second row of tubes 26 is combined in a series flow path with refrigerant flow through the first row 24 to maintain the velocity of liquid refrigerant flow following partial condensation of refrigerant within the condenser 10. The third row of tubes 28 is subjected to less cooling and is not coupled in series so as to maintain the condensation process therein.

The resultant effect is to produce a heat transfer from the hot high pressure vapor flow through the inlet fitting 12 to maintain a large tube volume for condensation of refrigerant vapor within the condenser 10 while improving liquid refrigerant velocity at the end of tube sections of the first, second and third rows 24, 26, 28. Such an arrangement produces an efficient heat transfer from the refrigerant into the cooling fins 30 from which energy is extracted into the airflow thereacross during the condensing process. The arrangement is especially suited for use with alternative refrigerants which have a lesser heat capacity than HCFC-12 in automotive air conditioning systems.

The embodiment shown in FIG. 2 includes a condenser 40 having an inlet 42 corresponding to the inlet 12 in the first embodiment. It has a conduit 42a that connects to a refrigerant system corresponding to that shown at 24 in the embodiment of FIG. 1. This embodiment includes a first front row of continuously bent tubes 46 located at the inlet side 48 of a condenser 40. A middle row of continuously bent tubes 50 is located in parallel relationship to the first row 46 and in spaced parallel relationship thereto downstream of the front row 46. The condenser 40 further includes a third row of spaced parallel tubes 52 located at the air outlet 54 of the condenser 40 as shown in FIG. 2.

In the FIG. 2 embodiment a three pronged outlet fitting 56 has a conduit 56a thereof connected to the refrigerant circuit of an automotive air conditioning system of the type shown at 23 in the first embodiment.

In the FIG. 2 embodiment, the front row 46 includes an inlet tube 46a that communicates a first tube set 46b of parallel tubes and U-bends with the inlet tube 42a for directing high pressure refrigerant vapor with respect to a plurality of cooling fins 60 that are connected to each of the three spaced rows 46, 50 and 52. The tube set 46b has an outlet tube 46d thereof connected to a cross over tube 58 to a U-bend 50a in the second row of tubes 50. An inlet tube 50b of the second row of tubes 50 connects to the inlet fitting 42 for directing high pressure vapor through the second row 50 through a first set of tubes and return bends 50c therein in parallel relationship to the high pressure vapor flow through the tube set 46b of the first row 46. The parallel flow of high pressure vapor in tube row 50 is then directed in series flow relationship through a second set of tubes 46e in the first row of tubes 46 and a second set of tubes 50d in the second row of tubes 50. The tube sets 46e and 50d are interconnected by a plurality of staggered U-bends 62, 64 formed at the bottom and top of the condenser 40 between the tube sets 46e and 50d to define a series flow path for the combined parallel flow of refrigerant upstream thereof. The series flow is then connected through an outlet tube 46f of the front row 46 which connects to the outlet fitting 56. The combined series flow through the tube sections 46e and 50d of the first and second rows 46 and 50 are combined with high pressure vapor flow through the third row of continuously bent tubes 52. The third row tubes 52 includes an inlet tube 52a thereof connected to the inlet fitting 42 and an outlet tube 52b connected to the outlet fitting 56 in which flow from all three rows is combined for passage through the outlet 56a.

As in the first embodiment, the portions of the condenser 40 that are cooled the greatest are reduced in volume to maintain the velocity of liquid refrigerant flow through the first and second rows so as to maintain the efficiency of heat transfer between refrigerant flow through the first and second rows 46, 50 into the cooling fins 60 while enhancing the condensation process in the remainder of third row tubes. As in the first embodiment, the third row accommodates the condensation process that will occur therein. As in the first embodiment, the condenser 40 has an efficient condensing capability because of the arrangement of the flow path therethrough which will provide for adequate cooling of alternative refrigerants having a lesser heat capacity than present day chlorofluorocarbon refrigerants.

A third embodiment of the invention is shown in FIG. 3. In this embodiment, a condenser 60 has a four pronged inlet fitting 70 is provided for directing high pressure refrigerant vapor into two parallel flow paths through a middle row 74 and a rear row 76 of parallel continuously formed U-bend and tube passes. The middle row 74 has an inlet tube 74a on one end thereof and an outlet tube 74b on the other end thereof that connect an inlet and outlet fitting 78, 80, respectively. Inlet and outlet tubes 76a and 76b of the tube row 76 also connect respectively to the inlet and outlet fittings 78, 80 and they in turn are connected to opposite end tubes 82a, 82b of a front row of U-bends and tubes 82. The front row of tubes 82 has an outlet fitting 84 therein with an outlet tube 84a that communicates condensed high pressure liquid refrigerant back to the high pressure liquid side of a refrigerant circuit corresponding to circuit 23 in the first embodiment. The high pressure vapor flow is through an inlet conduit 70a connected to the four pronged inlet fitting 70. This arrangement has a condenser capacity of nearly 50% over a baseline two row condenser. In this embodiment the refrigerant flow through the condenser 60 is maintained by reducing the flow area from the parallel sections of the rows 74, 76 to direct all of the outlet refrigerant in series flow relationship through sets of U-bends and tubes 82c and 82d in the outlet row of tubes 82. Row 82 is the first row of tubes to be initially cooled by inlet vehicle air flow at the inlet face 60a of the condenser 60 while the refrigerant inlet is located at the outlet end 60b of the air flow passages through the condenser 60 that are formed by a plurality of cooling fins 86, each of which are connected by suitable brazed connections to each of the tube rows 74, 76 and 82.

The resultant effect is to maintain a desired refrigerant velocity through all sections of the condenser for improving heat transfer capacity therefrom to make the condenser assembly 60 suitable for use with alternative refrigerants.

In a typical operation of a condenser made according to FIG. 1, a refrigerant such as HFC-134a is admitted to the condenser through the inlet port 12 at a high pressure, e.g. 250 psig and a temperature of about 180° F. Air flow through the fins 30 carries away heat until the gas condenses to a liquid at a temperature of 130° F. As the liquid flows to the outlet port 20, it cools further and exits at about 120° F. and at a pressure of 235 psig. The condensation occurs gradually as the refrigerant flows through the three row path so that the gaseous or two phase mixture is present in much of the three row path region. The junctions with the single paths 26c and 24e occurs, as a matter of design, approximately at the place where the refrigerant becomes wholly liquid under standard operating conditions. In a small condenser this point occurs at two thirds of the distance from the inlet 18, but for larger condensers the point moves closer to the half way point. During operation under nonstandard conditions, the liquid state will actually occur either upstream or downstream of the junction.

The result of essentially confining the liquid coolant to the single paths has several beneficial aspects. The liquid is forced to flow at a higher velocity (relative to the conventional dual path condenser) for more efficient heat transfer. Perhaps more importantly, for a given liquid throughput, the fast moving liquid occupies less volume or fewer tubes than in the conventional system so that a greater volume remains for the condensation process which is the more effective thermal transfer mechanism. These comparisons are for condensers having the same air pressure drop. In tests, the improved configuration (FIG. 1) has 50% higher heat capacity (Btu/min.) than a conventional two row unit. This allows a lower input pressure resulting in lower compressor outlet pressure which extends compressor life and also yields lower discharge temperatures from the air conditioning outlets.

It will thus be seen that the improved tube routing or circuit configuration for a condenser provides better heat transfer and a lower pressure drop than a conventional condenser of the same size and requires the same or less material for its use in an air conditioning system.

While the invention is shown and described with respect to three different embodiments of the present invention, it is understood that the invention is not limited to the specific embodiments shown therein, but is susceptible to other modifications and changes to those ordinarily skilled in the art and it is my intention to be limited neither in description nor in details to those shown and described herein, with it being understood that the invention is that encompassed within the scope of the appended claims hereto.

What is claimed is:

1. A three row condenser for an automotive air conditioning system longitudinally extending between first and second ends, and having first, second and third rows of continuously bent tubes interconnected by cross fins, each connected to said first, second and third rows of continuously bent tubes, each of said first, second and third rows of continuously bent tubes having an inlet tube and an outlet tube; a multipronged inlet fitting adapted to connect a high pressure vapor side of a refrigerant system in an automobile air conditioning system to the inlet tubes and a multipronged outlet fitting connected to the outlet tubes of said first, second and third rows of continuously bent tubes characterized by:

said first row of continuously bent tubes located in the air flow of a vehicle at an air inlet end of the condenser at a point upstream of the second and third rows of continuously bent tubes;

the third row of continuously bent tubes located at the air outlet side of the condenser;

at least one of said rows bent tubes continuously extending between the first and second ends directing refrigerant flow only within said row between the ends;

a cross over tube connecting said first row of continuously bent tubes to the second row of continuously bent tubes between the inlet and outlet tubes thereof for causing the refrigerant flow through the first and second rows to be combined prior to discharge thereof through the outlet fitting of the condenser; and means to combine said third row of tubes to the first and second rows prior to discharge of liquid refrigerant therein through the outlet fitting of the condenser.

2. A three row condenser for an automotive air conditioning system having first, second and third rows of continuously bent tubes interconnected by cross fins, each connected to said first, second and third rows of continuously bent tubes, each of said first, second and third rows of continuously bent tubes having an inlet tube and an outlet tube; a multipronged inlet fitting adapted to connect a high pressure vapor side of a refrigerant system in an automobile air conditioning system to the inlet tubes and a multipronged fitting connected to the outlet tubes of said first, second and third rows of continuously bent tubes characterized by:

said first row of continuously bent tubes located in a air flow of the vehicle at an air inlet end of the condenser at a point upstream of the second and third rows of continuously bent tubes;

the third row of continuously bent tubes located at the air outlet side of the condenser;

a cross over tube connecting said first row of continuously bent tubes to the second row of continuously bent tubes between the inlet and outlet tubes thereof for causing the refrigerant flow through the first and second rows to be combined prior to discharge thereof through the outlet fitting of the condenser; and means to combine said third row of tubes to the first and second rows prior to discharge of liquid refrigerant therein through the outlet fitting of the condenser;

said second row of continuously bent tubes having a plurality of the bent tubes therein directing the combined refrigerant flow from the first and second rows of continuously bent tubes to the outlet fitting and said outlet fitting combining the combined flow of the first and second rows of bent tubes with refrigerant flow through the third row of continuously bent tubes; and a plurality of the continuously bent tubes of the first row of continuously bent tubes directing the combined flow from said outlet fitting to a high pressure liquid side of a refrigerant circuit in an automotive air conditioning system.

3. A three row condenser for an automotive air conditioning system longitudinally extending between first and second ends, and having first, second and third rows of continuously bent tubes interconnected by cross fins, each connected to said first, second and third rows of continuously bent tubes, each of said first, second and third rows of continuously bent tubes having an inlet tube and an outlet tube; a multipronged inlet fitting adapted to connect a high pressure vapor side of a refrigerant system in an automobile air conditioning system to the inlet tubes and a multipronged outlet fitting connected to the outlet tubes of said first, second and third rows of continuously bent tubes characterized by:

said first row of continuously bent tubes located in the air flow of a vehicle at an air inlet end of the condenser at a point upstream of the second and third rows of at least one of said rows of bent tubes continuously bent tubes;

the third row of continuously bent tubes located at the air outlet side of the condenser and;

continuously extending between the first and second ends directing refrigerant flow wholly within said row;

a cross over tube connecting said first row of continuously bent tubes to the second row of continuously bent tubes between the inlet and outlet tubes thereof for causing the refrigerant flow through the first and second rows to be combined prior to discharge thereof through the outlet fitting of the condenser; and means to combine said third row of tubes to the first and second rows prior to discharge of liquid refrigerant therein through the outlet fitting of the condenser;

said first and second rows of continuously bent tubes including a plurality of U-bends located in a zig-zag pattern between parallel tube segments of said continuously bent tubes for flow therefrom through to the outlet fitting; and said outlet fitting combining the refrigerant flow through the third row of continuously bent tubes and the combined flow through said zig-zag pattern of U-bends to direct refrigerant from the condenser to a high pressure liquid side of a refrigerant circuit in an automotive air conditioning system.

4. A three row condenser for an automotive air conditioning system longitudinally extending between first and second ends and having first, second and third rows of continuously bent tubes interconnected by cross fins, each connected to said first, second and third rows of continuously bent tubes, each of said first, second and third rows of continuously bent tubes having end tubes, a multipronged fitting adapted to connect a high pressure vapor side of a refrigerant system in an automobile air conditioning system to the inlet tubes and a second multipronged fitting adapted to connect the first, second and third rows of continuously bent tubes to a high pressure liquid refrigerant conduit characterized by:

the first row of continuously bent tubes located in the air flow of a vehicle at an air inlet end of the condenser at a point upstream of the second and third rows of continuously bent tubes;

the third row of continuously bent tubes located at the air outlet side of the condenser; and at least one of said rows of bent tubes continuously extending between the first and second ends directing refrigerant flow wholly within said row;

a cross over tube connecting one of said rows of continuously bent tubes to another of said rows of continuously bent tubes between the end tubes thereof for causing the refrigerant flow therethrough to be combined prior to discharge therefrom the outlet fitting of the condenser and means including one of said multipronged fittings to combine all of said rows prior to discharge of liquid refrigerant therein through the outlet fitting of the condenser.

* * * * *